Patented Nov. 12, 1935

2,020,468

UNITED STATES PATENT OFFICE 2,020,468

DIELECTRIC MATERIAL AND METHOD OF MAKING

Raymond H. Hobrock, Chicago, Ill., assignor to Western Electric Company, Incorporated, New York, N. Y., a corporation of New York No Drawing. Application March 30, 1932, Serial No. 602,112

9 Claims. (Cl. 91—70)

This invention relates to an insulating composition suitable for impregnating dielectric material and a method of using the composition and more particularly in connection with condensers.

Many of the impregnating compositions used for impregnating absorbent or impregnable dielectrics for condensers are of a crystalline character in the solid state. When a crystalline impregnating composition changes from the liquid to the solid state, there is a change in volume which leaves spaces or voids at the crystal boundaries which deleteriously affect the properties of the dielectric impregnated therewith.

Objects of the invention are to provide an effective and efficient insulating composition and method of using it.

In accordance with the general features of the present invention, a crystalline impregnating material is combined with an amorphous material or a material having a greatly finer crystal structure and this second material is selected from a group of materials which is soluble in the first and has a lower melting point so that when the first material crystallizes, the second material will separate out from the solution in liquid form and fill the intercrystalline interstices, after which the second material will also solidify and form a dense medium having a high dielectric strength and a high insulation resistance.

It is believed that a complete understanding of the generic aspects of the invention may be had by reference to the following detailed description of specific embodiments of the invention.

In the manufacture of certain types of condensers, paper or other absorbent or impregnable material is used as a dielectric material between the condenser plates. On account of the hygroscopic and porous nature of such dielectric materials and also to increase the dielectric constant, it has been the practice in many instances to impregnate these materials with halogenated hydrocarbons, such as chlorinated naphthalene. This substance is crystalline in character when solid and in passing from the liquid to the solid state there is a considerable change in the volume of the material. As a result of this change in volume spaces or voids are left at the crystal boundaries which impair the dielectric strength and insulation resistance of the dielectric material.

It has been found that by adding to the halogenated hydrocarbon an amorphous hydrocarbon, which is soluble in and has a lower melting point than the halogenated hydrocarbon, and heating the materials to melt them and then allowing them to cool, a very dense medium is obtained which has a high dielectric strength and high insulation resistance. This is due to the fact that when the solution of the materials is cooled, the halogenated hydrocarbon crystallizes first and the solution becomes supersaturated, causing the amorphous hydrocarbon to separate out of the solution and fill the voids or spaces along the crystal boundaries of the halogenated hydrocarbon crystals.

Suitable halogenated hydrocarbons are chlorinated naphthalene or chlorinated stearic acid. Many materials which are ordinarily considered as amorphous and which appear to be amorphous when examined under the microscope are not in fact amorphous but have extremely fine crystals which can be detected by an examination of the Roentgen-ray diffraction spectrum of the material. Such substances may be said to be substantially amorphous and come within the range of materials contemplated by this invention. An example of such an amorphous material is "Superlawax," which is a solid hydrocarbon wax of the paraffin series derived from petroleum and having a melting point of 71° to 77° C., reference being made generally to Wendt et al., U. S. Patent 1,735,555, granted November 12, 1929 for a further description of such waxes and their mode of preparation. There are other paraffins which are probably truly amorphous which may also be advantageously used. A further example of a suitable amorphous hydrocarbon is petrolatum which gives a dense impregnating medium when used with a halogenated hydrocarbon.

In making paper foil condensers, alternate layers of paper and metal foil are wound together in a roll to form a condenser body. This body is then treated to expel the moisture from the body by applying heat thereto at a sub-atmospheric pressure. The condenser body is then impregnated with a composition which may consist of approximately 90% of chlorinated naphthalene and 10% of "Superlawax". These materials are melted together to form a solution and the condenser body is impregnated with the solution. The condenser body is then allowed to cool, causing the chlorinated naphthalene to crystallize, which separates out the "Superlawax" in liquid form to fill the spaces surrounding the crystal boundaries of the chlorinated naphthalene. Thereafter the "Superlawax" solidifies, forming a dense medium substantially free from voids and having a high dielectric strength and insulation resistance. The proportions given above are not critical and may be varied considerably. However, in view of the fact that chlorinated naphthalene has better dielectric properties than many of the other impregnating materials, it is desirable to use a greater proportion of this material, using only sufficient of the lower melting point material to fill the voids left in the chlorinated naphthalene composition when the latter crystallizes.

It will be understood that the nature and embodiments of the invention herein described are merely illustrative and that many changes and modifications may be made therein without departing from the spirit and scope of the invention.

What is claimed is:

1. A dielectric material for condensers impregnated with an insulating composition comprising a mixture of a crystalline substance, in major proportions, selected from a group consisting of halogenated naphthalene and halogenated stearic acid and a substantially amorphous paraffin hydrocarbon, having a lower melting point, in minor proportions, the components of said mixture being soluble in the liquid phase and insoluble in the solid phase.

2. A dielectric material for condensers impregnated with an insulating composition comprising a mixture of a crystalline chlorinated naphthalene, in major proportions, and a substantially amorphous paraffin hydrocarbon, having a lower melting point, in minor proportions, the components of said mixture being soluble in the liquid phase and insoluble in the solid phase.

3. A dielectric material for condensers impregnated with an insulating composition comprising a mixture of a crystalline chlorinated naphthalene, in major proportions, and a substantially amorphous paraffin hydrocarbon, having a lower melting point, in minor proportions, selected from a group consisting of paraffin wax, petrolatum and "Superlawax", the components of said mixture being soluble in the liquid phase and insoluble in the solid phase.

4. A dielectric material for condensers impregnated with an insulating composition, comprising a mixture of a crystalline substance, in major proportions, selected from a group consisting of halogenated naphthalene and halogenated stearic acid, and a substantially amorphous hydrocarbon wax of the paraffin series having a lower melting point, in minor proportions, the components of said mixture being soluble in the liquid phase, but upon solidification thereof become insoluble and separate to permit the substantially amorphous hydrocarbon wax of the paraffin series to fill the intercrystalline interstices that occur in said crystalline substance.

5. A dielectric material for condensers impregnated with an insulating composition, comprising a mixture of a crystalline chlorinated naphthalene, in major proportions, and a substantially amorphous paraffin hydrocarbon having a lower melting point, in minor proportions the components of said mixture being soluble in the liquid phase, but upon solidification thereof become insoluble and separate to permit the substantially amorphous paraffin hydrocarbon to fill the intercrystalline interstices that occur in the crystalline chlorinated naphthalene.

6. A dielectric material for condensers impregnated with an insulating composition, comprising a mixture of a crystalline chlorinated naphthalene, in major proportions, and a substantially amorphous paraffin hydrocarbon having a lower melting point, in minor proportions, selected from a group consisting of paraffin wax, petrolatum and "Superlawax", the components of said mixture being soluble in the liquid phase, but upon solidification thereof becomes insoluble and separate to permit the substantially amorphous paraffin hydrocarbon to fill the intercrystalline interstices that occur in the crystalline chlorinated naphthalene.

7. A method of impregnating dielectric material, which consists in melting a mixture of crystalline substance, in major proportions, said crystalline substance to be selected from a group consisting of halogenated naphthalene and halogenated stearic acid, and a substantially amorphous paraffin hydrocarbon, in minor proportions, which is soluble therein in a molten state and has a lower melting point, impregnating the dielectric material with the solution, causing the materials to solidify, whereby said crystalline substance separates from the solution and the substantially amorphous paraffin hydrocarbon of a lower melting point fills the intercrystalline interstices and subsequently solidifies.

8. A method of impregnating dielectric material, which consists in melting a mixture of crystalline chlorinated naphthalene, in major proportions, and a substantially amorphous paraffin hydrocarbon, in minor proportions, which is soluble therein in a molten state and has a lower melting point, impregnating the dielectric material with the solution, causing the materials to solidify, whereby the crystalline chlorinated naphthalene separates from the solution and the substantially amorphous paraffin hydrocarbon of a lower melting point fills the intercrystalline interstices and subsequently solidifies.

9. A method of impregnating dielectric material, which consists in melting a mixture of crystalline chlorinated naphthalene, in major proportions, and a substantially amorphous paraffin hydrocarbon, in minor proportions, which is soluble therein in a molten state and has a lower melting point, said amorphous paraffin hydrocarbon to be selected from a group consisting of paraffin wax, petrolatum and "Superlawax", impregnating the dielectric material with the solution, causing the materials to solidify, whereby the crystalline chlorinated naphthalene separates from the solution and the substantially amorphous paraffin wax of a lower melting point fills the intercrystalline interstices and subsequently solidifies.

RAYMOND H. HOBROCK.